United States Patent
Barua

(10) Patent No.: US 11,714,938 B2
(45) Date of Patent: Aug. 1, 2023

(54) METHOD FOR DISTORTION PREDICTION AND COMPENSATION FOR SINTERING OF BINDER JET PRINTED PARTS

(71) Applicant: General Electric Company, Schenectady, NY (US)

(72) Inventor: Ananda Barua, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 16/542,860

(22) Filed: Aug. 16, 2019

(65) Prior Publication Data

US 2021/0049244 A1 Feb. 18, 2021

(51) Int. Cl.
*G06F 30/13* (2020.01)
*G06F 30/23* (2020.01)
(Continued)

(52) U.S. Cl.
CPC .............. *G06F 30/23* (2020.01); *G06T 17/20* (2013.01); *B33Y 10/00* (2014.12); *B33Y 50/02* (2014.12);
(Continued)

(58) Field of Classification Search
CPC .................................. G06F 30/23; G06T 17/20
(Continued)

(56) References Cited

U.S. PATENT DOCUMENTS

| 9,950,476 B2 | 4/2018 | Nguyen et al. |
| 2016/0246908 A1 | 8/2016 | Komzsik |

(Continued)

FOREIGN PATENT DOCUMENTS

| CN | 102831263 B | 7/2015 |
| CN | 106055764 A | 10/2016 |

(Continued)

OTHER PUBLICATIONS

Ding et al. (Ding, J. et al. "A computationally efficient finite element model of wire and arc additive manufacture", 70 pp. 227-236). (Year: 2014).*

(Continued)

*Primary Examiner* — Andre Pierre Louis
(74) *Attorney, Agent, or Firm* — Dority & Manning, P.A.

(57) ABSTRACT

According to some embodiments, system and methods are provided comprising receiving, via a communication interface of a distortion and correction module comprising a processor, a defined geometry for one or more parts, wherein the parts are manufactured with an additive manufacturing machine; discretizing the defined geometry into a mesh including a plurality of nodes; predicting a distortion of a position of each node of the plurality of nodes; determining whether the predicted distortion position exceeds a pre-set tolerance; determining an adjusted pre-distortion position for each node of the plurality of nodes when the predicted distortion position exceeds the pre-set tolerance; predicting a distortion of the adjusted determined pre-distortion position for each node of the plurality of nodes; determining whether the distortion of the determined adjusted pre-distortion position exceeds the pre-set tolerance; and printing the part when one of the predicted distortion position and the predicted adjusted pre-distortion position is below the pre-set tolerance. Numerous other aspects are provided.

19 Claims, 9 Drawing Sheets

(51) Int. Cl.
*G06T 17/20* (2006.01)
*B33Y 10/00* (2015.01)
*B33Y 50/02* (2015.01)
*G06F 119/18* (2020.01)

(52) U.S. Cl.
CPC .... *G06F 2119/18* (2020.01); *G06T 2219/012* (2013.01)

(58) Field of Classification Search
USPC .......................................................... 703/1
See application file for complete search history.

(56) References Cited

U.S. PATENT DOCUMENTS

| | | | |
|---|---|---|---|
| 2016/0320771 A1 | 11/2016 | Huang | |
| 2017/0169612 A1* | 6/2017 | Cashen | G06T 19/20 |
| 2017/0232517 A1* | 8/2017 | Morton | G06F 30/17 |
| | | | 419/29 |
| 2017/0282247 A1 | 10/2017 | Cullinan et al. | |
| 2017/0368753 A1* | 12/2017 | Yang | G05B 19/4099 |
| 2018/0307209 A1* | 10/2018 | Chin | B29C 64/386 |
| 2019/0099951 A1* | 4/2019 | Zhang | G06T 19/20 |
| 2020/0290266 A1* | 9/2020 | Bhatt | B29C 64/393 |

FOREIGN PATENT DOCUMENTS

| | | |
|---|---|---|
| CN | 106529091 A | 3/2017 |
| JP | 5603107 B2 | 10/2014 |

OTHER PUBLICATIONS

Sheng et al. ("Application of Frictional Contact in Geotechnical Engineering", 10 pages)). (Year: 2007).*

Bhandari, Sunil et al., "Finite element analysis of thermoplastic polymer extrusion 3D printed material for mechanical property prediction", Additive Manufacturing, vol. 22, Aug. 2018, DOI: 10.1016/j.addma.2018.05.009, (pp. 187-196, 10 total pages).

Luo, Zhibo et al., "A survey of finite element analysis of temperature and thermal stress fields in powder bed fusion Additive Manufacturing", Additive Manufacturing, vol. 21, May 2018, DOI: 10.1016/j.addma.2018.03.022, (pp. 318-332, 15 total pages).

* cited by examiner

Sintered coupons showing sagging due to gravity

US 11,714,938 B2

METHOD FOR DISTORTION PREDICTION AND COMPENSATION FOR SINTERING OF BINDER JET PRINTED PARTS

BACKGROUND

Additive manufacturing (AM) processes are used to fabricate precision three-dimensional components from a digital model. Such components are fabricated using an additive process, where successive layers of material are consolidated one on top of the other on a build plate in an additive manufacturing machine (AMM). An example of an AM process is binder jet printing. In binder jet printing, a binder is selectively deposited onto a powder bed of material on the build plate, bonding these areas together to form a solid part one layer at a time. The material may be, for example, polymers, metals, ceramics, etc. The binder jet printing joins the grains/particles of material of the powder bed together via the binder to create a binder-printed part. This binder-printed part may be referred to as a "green part". The green part may then be received in a sintering furnace. The sintering furnace applies a high temperature (e.g., ~1000° C.) to the green part, and the binder may be decomposed or otherwise burned-out, and then the temperature may be raised to sinter the particles such that the powder material particles are solidified together to form a sintered and solid part. As a result of the sintering process, the shape of the sintered part may be distorted from the green part. Conventional processes may predict a distortion of the sintered part, but to do so they solve a complex, transient problem that takes a long time (hours-days) to solve, making them unusable for quick iterative design approaches. Further, the conventional prediction processes use several assumptions about parameters that are hard to validate, making the output of conventional prediction processes less accurate.

Therefore, it would be desirable to provide a system and method that more efficiently and accurately predicts a distortion of a sintered part.

BRIEF DESCRIPTION

According to some embodiments, a method includes receiving, via a communication interface of a distortion and correction module comprising a processor, a defined geometry for one or more parts, wherein the parts are manufactured with an additive manufacturing machine; discretizing the defined geometry into a mesh including a plurality of nodes; predicting a distortion of a position of each node of the plurality of nodes; determining whether the predicted distortion position exceeds a pre-set tolerance; determining an adjusted pre-distortion position for each node of the plurality of nodes when the predicted distortion position exceeds the pre-set tolerance; predicting a distortion of the adjusted determined pre-distortion position for each node of the plurality of nodes; determining whether the distortion of the determined adjusted pre-distortion position exceeds the pre-set tolerance; and printing the part when one of the predicted distortion position and the predicted adjusted pre-distortion position is below the pre-set tolerance.

According to some embodiments, a system includes an additive manufacturing device operative to fabricate one or more parts; a distortion and correction module; and a memory in communication with the additive manufacturing device and storing program instructions, the distortion and correction module operative with the program instructions and additive manufacturing device to perform the functions as follows: receive a defined geometry for the one or more parts; discretize the defined geometry into a mesh including a plurality of nodes; predict a distortion of a position of each node of the plurality of nodes; determine whether the predicted distortion position exceeds a pre-set tolerance; determine an adjusted pre-distortion position for each node of the plurality of nodes when the predicted distortion position exceeds the pre-set tolerance; predict a distortion of the adjusted determined pre-distortion position for each node of the plurality of nodes; determine whether the distortion of the determined adjusted pre-distortion position exceeds the pre-set tolerance; and print the part when one of the predicted distortion position and the predicted adjusted pre-distortion position is below the pre-set tolerance.

According to some embodiments, a non-transitory computer readable medium includes instructions that, when executed by a computer processor, cause the computer processor to perform a method comprising receiving, via a communication interface of a distortion and correction module comprising a processor, a defined geometry for one or more parts, wherein the parts are manufactured with an additive manufacturing machine that applies a binder jet printing process to manufacture the part; discretizing the defined geometry into a mesh including a plurality of nodes; predicting a distortion of a position of each node of the plurality of nodes; determining whether the predicted distortion position exceeds a pre-set tolerance; determining an adjusted pre-distortion position for each node of the plurality of nodes when the predicted distortion position exceeds the pre-set tolerance; predicting a distortion of the adjusted determined pre-distortion position for each node of the plurality of nodes; determining whether the distortion of the determined adjusted pre-distortion position exceeds the pre-set tolerance; and printing the part when one of the predicted distortion position and the predicted adjusted pre-distortion position is below the pre-set tolerance.

A technical effect of some embodiments of the invention is an improved technique and system for predicting a distortion of a sintered part from a green part, and compensating or correcting for the distortion. Some embodiments provide for the ability to manufacture parts which would have large distortions if not compensated. Some embodiments provide for the ability to manufacture large parts with complex features which cannot be conventionally binder jet printed due to the level of distortion. Some embodiments provide for the ability to manufacture 3D printed parts using powder metallurgy which are conventionally beyond a size capacity of existing direct metal laser melting (DMLM) 3D printers. Some embodiments provide for a reduction in manufacturing costs and manufacturing time for additive printing. Some embodiments may enable organizations to leverage additive printing by reducing the part distortion to an acceptable tolerance level. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

FIGS. 1A and 1B illustrate a green part and a sintered part.
FIGS. 2A-2C illustrate a part according to some embodiments.
FIG. 3 illustrates a flow diagram according to some embodiments.

DETAILED DESCRIPTION

Figure 1A:
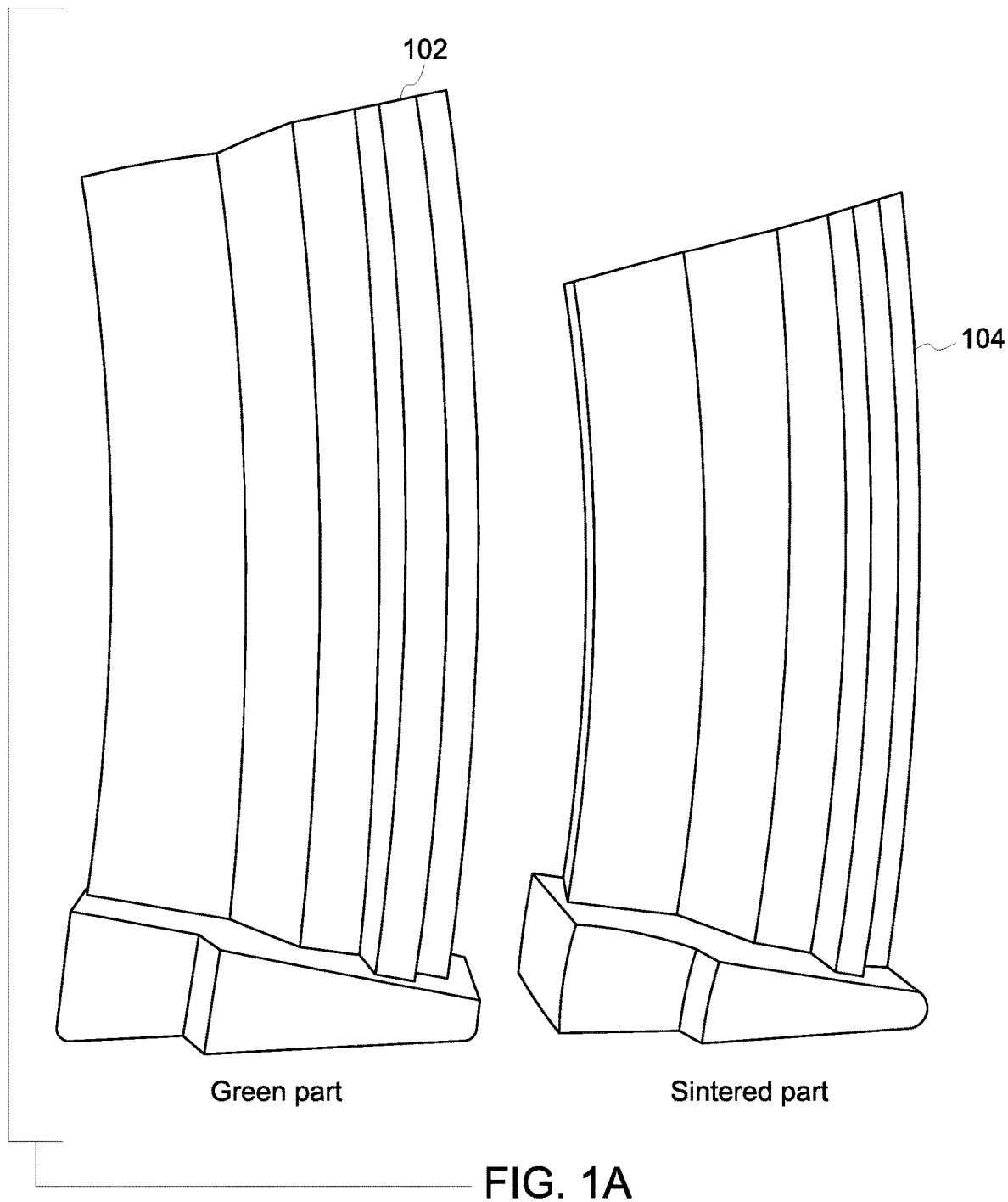
Figure 1B:
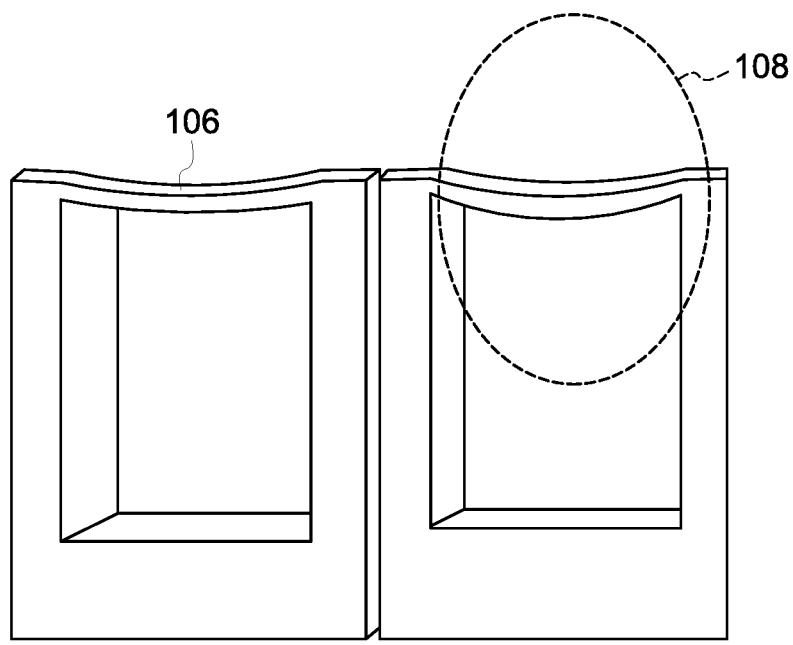
Figure 2A:
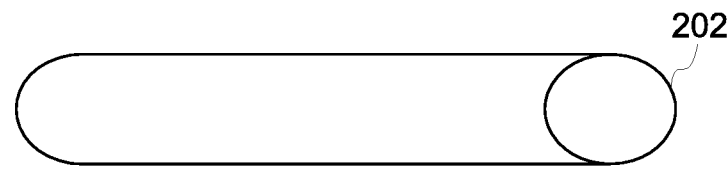
Figure 2B:
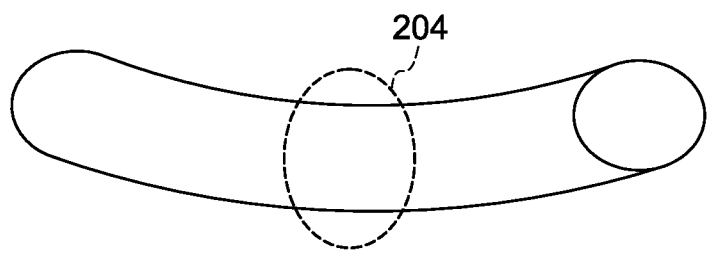

The sintering of a green part at a high temperature (e.g., ~1000° C.) may cause significant distortion of the part. This distortion may be a result of the thermally-induced processes of sintering. For example, the sintering process may include densification of the initially porous part leading to volumetric shrinkage. As a non-exhaustive example, FIG. 1A provides a green part 102 and a shrunken sintered part 104. It is noted that while shrinkage may distort the part, it may not deform the part. As a non-exhaustive example, the green part 102 may have a low density (e.g., 50-70% dense), and may be transformed via the sintering process to a sintered part 104 having a high density (e.g., 95-98% dense). The distortion may also be a result of gravity induced warpage of the part. As a non-exhaustive example, FIG. 1B provides a sintered coupon of a part 106 showing sagging 108 due to gravity. As another non-exhaustive example of gravity-induced distortion, if the sintered part is a bar 202 (FIG. 2A), and it is held at each end while warm, the middle 204 may sag from gravity to form a "c" shape (FIG. 2B).

The distortion problem conventionally limits the Binder Jet AM industry to manufacturing small parts with simple geometries, as they do not have significant distortion during sintering.

Figure 2C:
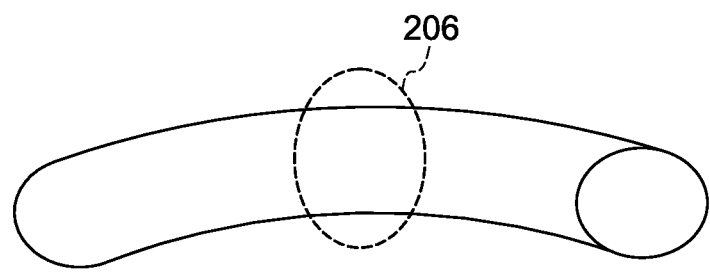

Embodiments provide for a distortion and correction module to calculate part distortion during sintering. In one or more embodiments, the distortion and correction module may virtually pre-distort parts prior to printing such that the part sinters to the required shape after the sintering process is complete. Continuing with the bar example described above in FIGS. 2A and 2B, the distortion and correction module may, in one or more embodiments, predict the distorted shape in FIG. 2B, and then calculate a correction 206 as shown in FIG. 2C to form an "n" shape. Pre-distorting (i.e., changing the original geometry) the green part prior to sintering may result in the sintered part matching (or substantially matching) the green part shown in FIG. 2A. It is noted that in one or more embodiments, the pre-distortion may not be exactly the opposite displacement as the predicted distortion, as the distortion and correction module may optimize the number of iterations until an acceptable pre-distortion is calculated. Continuing with the bar example, from the bar 202 in FIG. 2A to the "c"-shape in FIG. 2B, the center of the bar has been displaced one inch. However, if the center of the green part is pre-distorted an inch in the opposite direction, it may not result in a sintered part matching the green part because an arch (e.g., curve of the shape) may not distort in the same way the linear bar does. As such, an "n" shape with a 1-inch arch may not move down by one inch to form the linear bar, and instead, via several iterations of the process described herein, the distortion prediction and correction nodule may determine that an "n" shape with a half-inch arch may be distorted by the sintering process to form the linear bar, matching the green part 202 in FIG. 2A.

Figure 3:
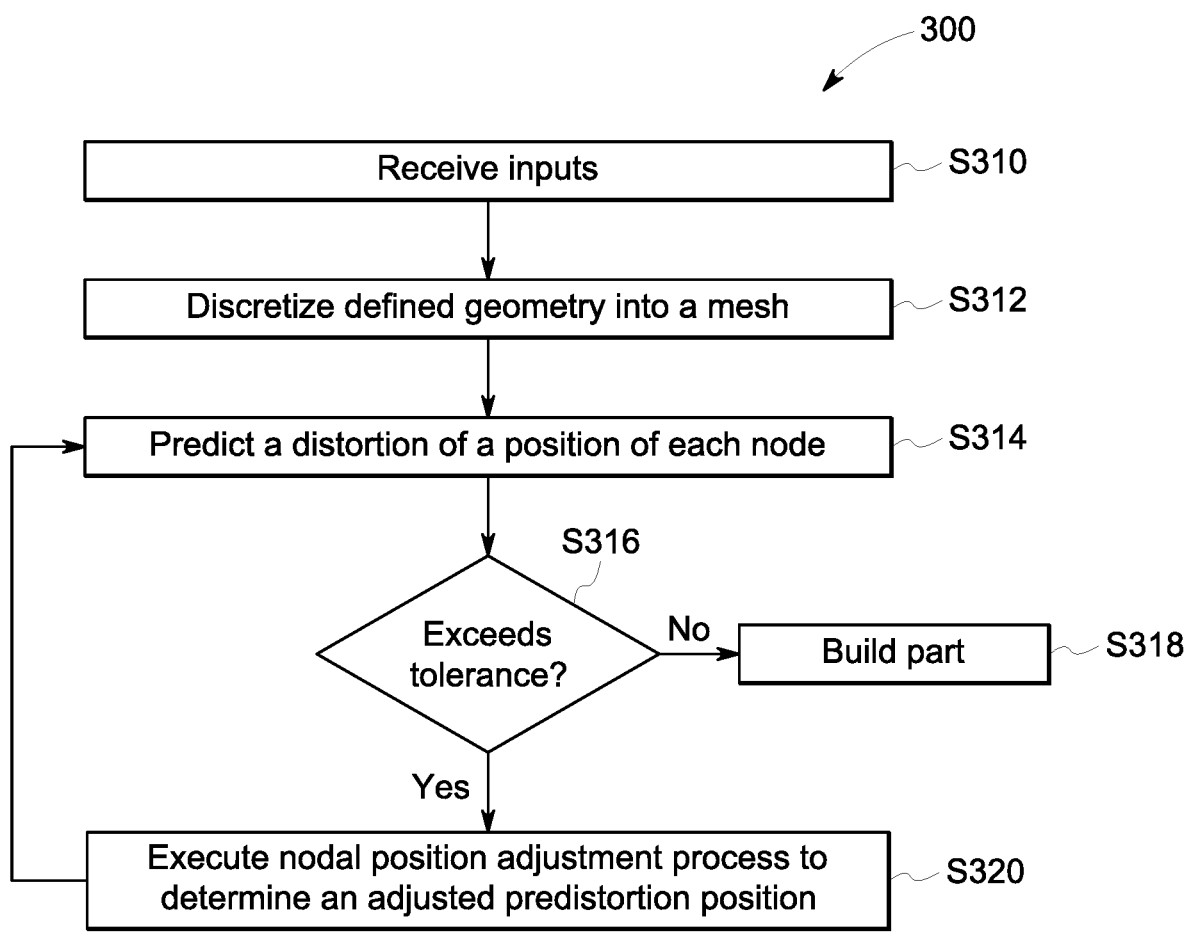

Turning to FIGS. 3-6, a system 500 and diagrams of examples of operation according to some embodiments are provided. In particular, FIG. 3 provide a flow diagram of a process 300, according to some embodiments. Process 300 and other processes described herein may be performed using any suitable combination of hardware (e.g., circuit(s)), software or manual means. In one or more embodiments, the system 500 is conditioned to perform the process 300 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

Initially, at S310, inputs 502 are received at a distortion and correction module 504. In one or more embodiments, the distortion and correction module 504 may be associated with an Additive Manufacturing Machine (AMM) 506 for manufacturing a part, as described further below. The distortion and correction module 504 may be part of the AMM or communicatively coupled thereto. In one or more embodiments, the input 502 may include at least one of a defined geometry for one or more parts 508, a material used to manufacture the part(s), one or more design tolerances associated with the part 508, powder size distribution, a sintering profile (e.g., specification of time and temperature and environment at which the part will be sintered), expansion factors (e.g., geometric scaling factors in X, Y, Z spatial dimensions, to correct the part for shrinkage during sintering), an effective elastic modulus of the material undergoing the sintering process and other relevant material properties such as Poisson's ratio and density, and tolerance capability of the AM process. In one or more embodiments, the defined geometry 400 for the part may be in the form of a CAD model 400 (FIG. 4A), or any other suitable model.

Figure 4A:
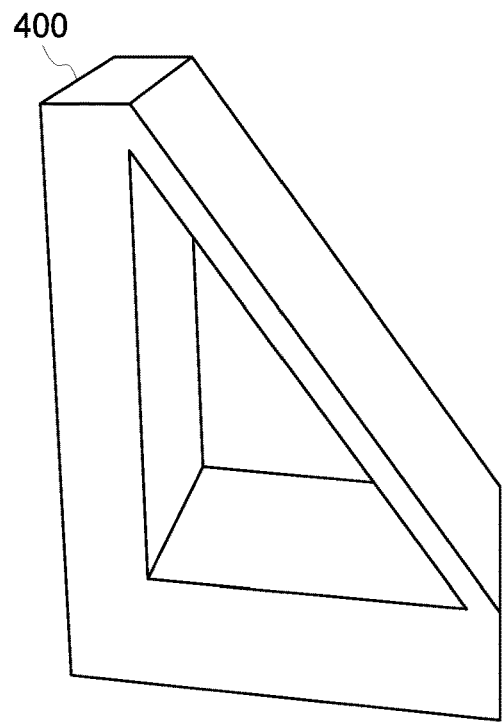
FIGS. 4A and 4B illustrate a model according to some embodiments.
Figure 4B:
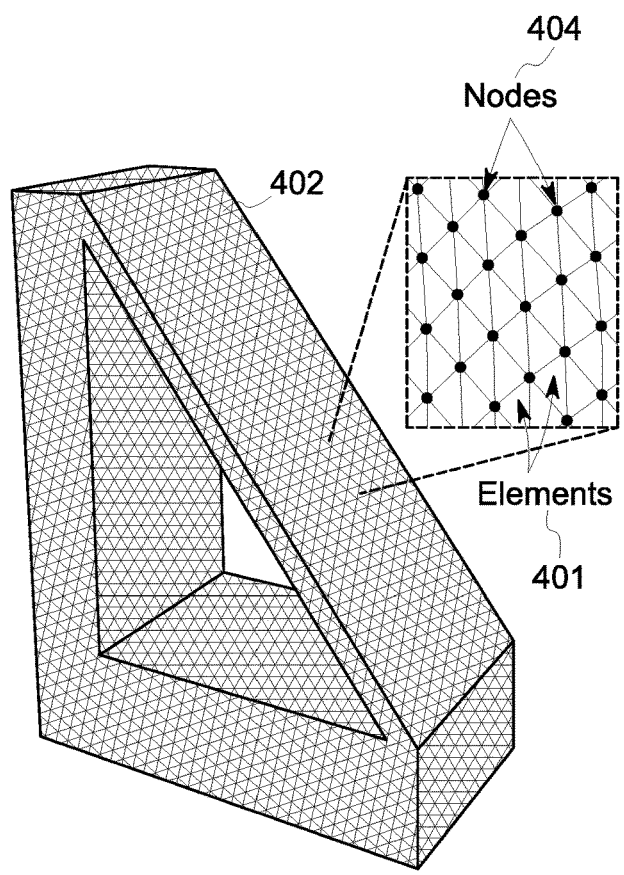

Then, in S312, the defined geometry 400 is discretized into a mesh 402 including a plurality of nodes 404 (FIG. 4B). The "elements" 401 shown in FIG. 4B are discrete solids which are populated to make up the full solid geometry. An element is the smallest discrete region of the solid for purpose of the analysis. An element may be represented by a tetrahedron (4 sided), parallelepiped (6 sided), etc. Typically, nodes represent the corners and/or mid-sides of elements. Any suitable meshing process may be used to discretize the defined geometry 400 into the mesh 402. Each node 404 has a tolerance associated therewith with respect to the distance the node may be displaced from its original position in the mesh. The tolerance may be provided by a designer of the CAD model, or any other suitable user. The tolerance may also be specified for a subset of the nodes.

Figure 6A:
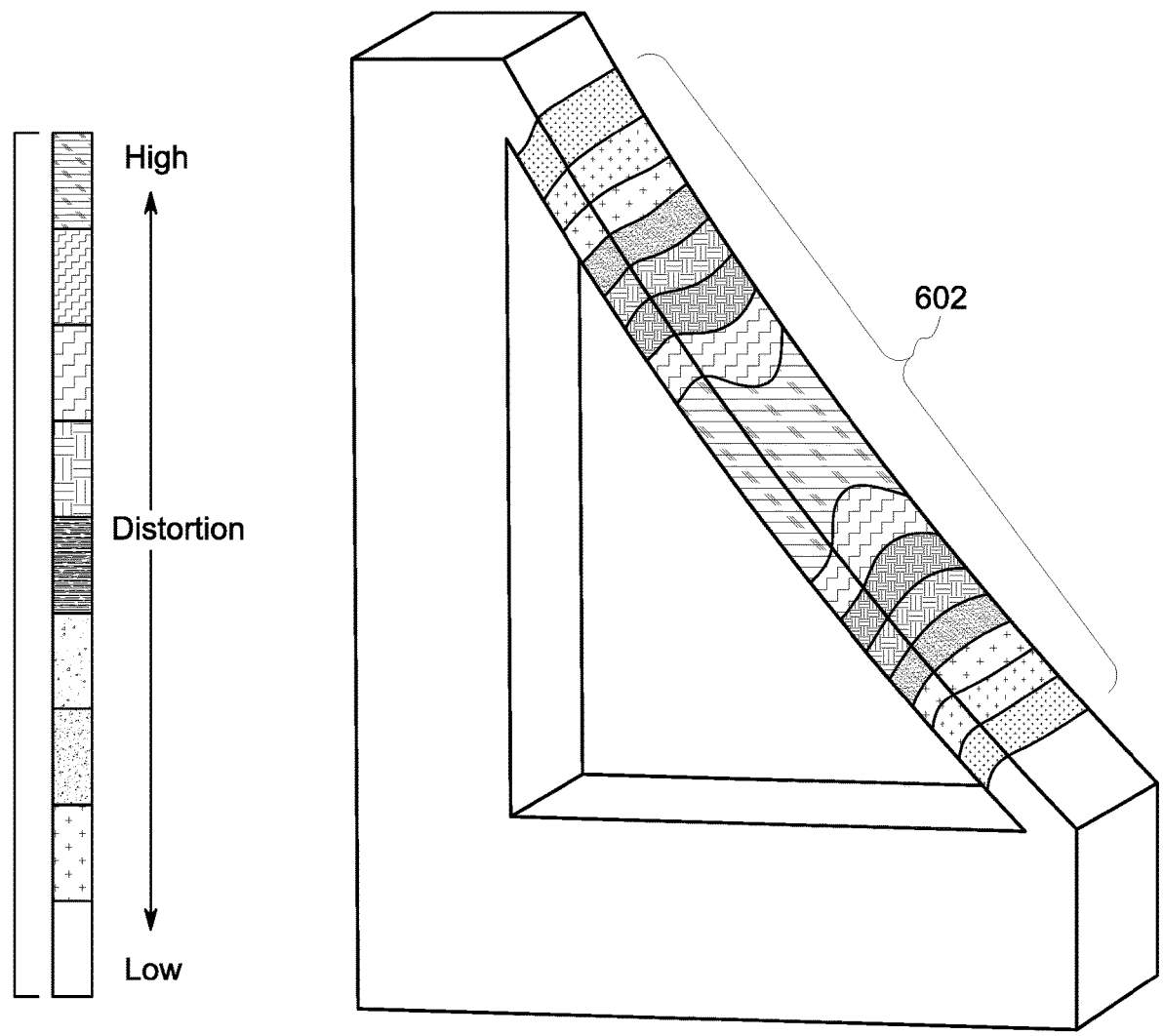
FIG. 6A illustrates a predicted distortion according to some embodiments.

Next, in S314, a distortion or displacement 602 of a position of each node 404 after sintering is predicted. This prediction may be based on the finite element analysis of the part geometry under the appropriate boundary and loading conditions and using the material properties provided as inputs. The loading condition for the analysis may include gravity as one of the external forces. The boundary condition may include displacement constraints relative to the surface on which the part is placed during sintering. This analysis may be a linear or non-linear analysis and it may be used to calculate the displacement of each node of the model. As used herein, the terms "distortion" and "displacement" may be used interchangeably. In one or more embodiments, the distortion and correction module 504 may execute a distortion prediction model 510 to determine the predicted distortion for the part during sintering. For example, as shown in FIG. 6A, the different shading represents the extent of the displacement of the nodes as compared to an original position, such as the mesh shown in FIG. 4B.

In one or more embodiments, a calibration process 516 may be used to determine a predicted amount of nodal displacement from the original. During the calibration process 516, in one or more embodiments, a certain set of coupons are printed for a particular sintering profile with the exact same powder and printer using the same process settings. Then the distortion is experimentally measured from those coupons relative to an undeformed reference geometry. The measured distortion is used to evaluate the effective material parameters that resulted in the distortion of the calibration coupon. This set of effective material parameters is referred to as the calibration model 520. The material properties of the calibration model 520 may be used by the distortion prediction model 510 to predict how much the actual part will be distorted from the original (e.g., the amount of nodal displacement for the original position.

The distortion prediction model 510 may be executed as a static analysis in a finite element analysis framework 512. In one or more embodiments, the deformation may be calculated by performing a finite element calculation per the finite element framework 512 of the geometry under loading and boundary conditions of the sintering process. In the finite element framework 512, the part geometry may be divided into finite elements (e.g., thousands, millions) which may be solids governed by the material behavior of the calibration model 520. Then the deformation of all the elements maybe calculated in one or more embodiments. In one or more embodiments, the distortion prediction model 510 may assume steady state behavior of the analysis. It is noted that although the sintering process is a transient phenomenon, the relatively long hold time of a sintering process (e.g., about 1-10 hours) at the elevated temperatures may cause the deformation during the sintering process similar to that obtained during a steady state process/condition. It is also noted that the distortion prediction model 510 assumes that most of the part distortion occurs at this steady state condition. The part is assumed to have linear elastic material properties (e.g., stiffness and Poisson's ratio) as per the calibration model 520. In other embodiments, the part may also be assumed to have non-linear material properties based on the powder, material and sintering condition. In one or more embodiments, it is assumed the part 508 has an elastic modulus (stiffness) value that is the same as that at the weakest point of the part during the sintering process. The sintering profile input 502 is often a multi-step thermal process where the part transitions through a range of temperature conditions. For a particular material, the process is held steady (i.e., "steady state") at the highest temperature for a sufficiently long time such that the porosities are closed out and the required density is achieved. Thus, in the finite element analysis 512, instead of simulating the full transient sintering profile, one or more embodiments provide for most of the distortion to occur during this steady state condition. Also, at this steady state condition, the part is at its weakest stiffness. An effective value of the stiffness may be used, in one or more embodiments, as the elastic modulus of the part in the finite element analysis 512. It is noted that the finite element analysis 512 applied by the distortion prediction model 510, used in some embodiments, may set the part to having a linear elastic behavior at steady state conditions. It is noted that using the linear elastic behavior, a distortion for a typical part may determined in a few minutes and results may then be used for compensation or part/support re-design. It is noted that non-linear material behavior may also be considered for distortion based on the powder, material and sintering condition.

It is noted that unlike conventional distortion prediction processes that use time-dependent and non-linear properties, some embodiments use a static analysis with or without linear material properties. An advantage of using the static analysis with linear material properties is that the prediction may be determined in a linear framework, which allows the distortion to be calculated with less computational time and complexity. In case the material properties are non-linear, the static analysis still allows considerable reduction of computation complexity in comparison to a transient analysis. In some embodiments, the distortion prediction model 510 may receive loading and boundary condition input 502 for the part 508. In one or more embodiments, gravity loading and contact friction are external forces that may be received by the distortion prediction model 510 to apply correct loading and boundary conditions for the prediction.

Then, in S316, it is determined whether the predicted distortion 602 for each node exceeds a pre-set tolerance 514. In one or more embodiments, the pre-set tolerance 514 is determined by the design requirement for the part. In one or more embodiments, it may be determined whether an aggregation of predicted distortions exceeds a pre-set tolerance (e.g., the distortion for node 1 exceeds the tolerance, but the distortion for nodes 2 and 3 is within the pre-set tolerance).

When it is determined in S316 that the predicted distortion 602 does not exceed the pre-set tolerance 514, the process proceeds to S318 and the pre-distorted geometry associated with the part is exported to the AMM machine 506 to build the part. In one or more embodiments, after the part 508 is built (e.g., printed and sintered), any distortions may be measured, and it may be determined whether the measured distortions exceed the pre-set tolerance. When the measured distortion is within the pre-set tolerance, production of the part may continue. When the measure distortion exceeds the pre-set tolerance, the part may be re-designed, and the re-design may be analyzed by the distortion and correction module 504.

When it is determined in S316 that the predicted distortion 602 does exceed the pre-set tolerance 514, the process proceeds to S320 and a nodal position adjustment process 517 is executed to determine an adjusted pre-distortion position 518 for each node.

Figure 6B:
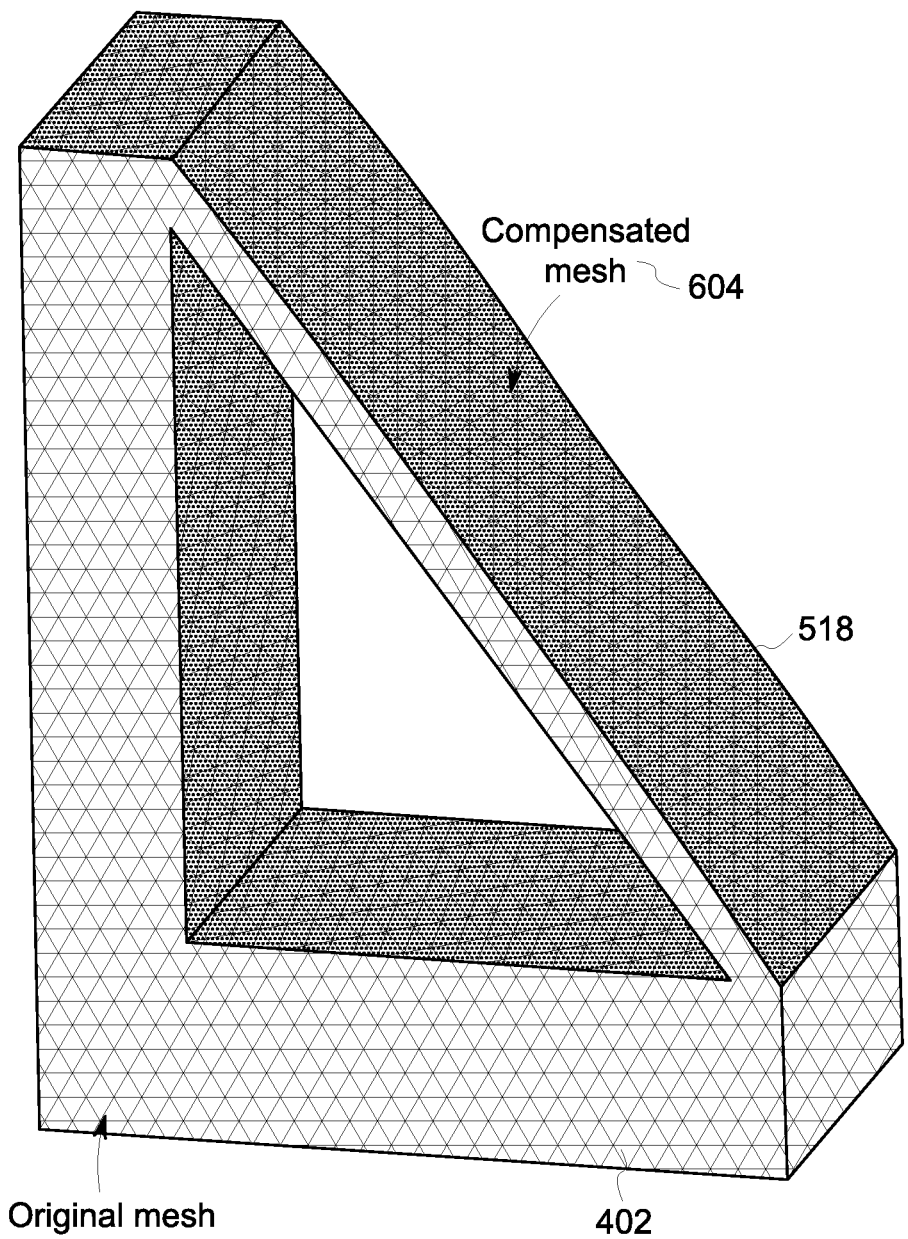
FIG. 6B illustrates a corrected distortion according to some embodiments.

In one or more embodiments, the nodal position adjustment process 517 may use the calibration model 520 to determine an adjusted pre-distorted position 518 for each node. In one or more embodiments, the adjustment of the nodal positions 518 may be based on the distortion prediction in S314. In one or more embodiments, with the adjustment, the original coordinates of the nodes may be modified so as to be opposite to the direction that they are predicted to distort. For example, FIG. 6B provides a compensated mesh 604 indicating the correction or compensation per the adjusted nodal positions 518. Note that not all of the nodes in the original mesh 402 are adjusted. As a non-exhaustive example, if a node is predicted to distort +5 mm in the current iteration, the adjustment may be to move the node back to −c*5 mm, where "c" is a scaling factor 522 that can be set for each node. The scaling factor 522 may be a scalar number and it determines the extent to which the node is moved during the adjustment process. This scalar number may be defined separately for each node. It can also be set by the user as an input to the correction module. As described above with the bar example, from the bar 202 in FIG. 2A to the "c"-shape in FIG. 2B, the center 204 of the bar has been displaced one inch. However, if the center of the green part is pre-distorted i.e., adjusted) an inch in the opposite direction, it may not result in a sintered part matching the green part because an arch (e.g., curve of the shape) may not distort in the same way the linear bar does. As such, an "n" shape with a 1-inch arch may not move down by one inch to form the linear bar. Via several iterations of the process described herein, the distortion prediction and correction module 504 may determine that an "n" shape with a half-inch arch may be distorted by the sintering process to form the linear bar, matching the green part in FIG. 2A. In one or more embodiments, the distortion and correction module 504 may use the scaling factor 522 to determine the adjustment. As described above, everywhere in the part may not distort in the same way, so different nodal points may be adjusted in different ways, per the scaling factor 522, to arrive at a part within tolerance.

In one or more embodiments, the scaling factor 522 may be used to optimize the number of iterations, as accounting for the different distortions in the part, via the scaling factor, may result in determining the adjusted pre-distorted positions quicker than without using the scaling factor. It is also noted that for certain parts, it may be desirable to converge to a within-tolerance part in a faster amount of time, so a greater scaling factor 522 may be applied, which may result in less iterations. This is applicable to parts which have distortion occurring primarily in one region of the part.

In one or more embodiments, the scaling factor 522 may be applied to all nodes or on a per node basis. The scaling factor 522 may also be one of a constant or a variable.

The process 300 then returns to S314 to predict a distortion for the adjusted pre-distorted positions 518. In one or more embodiments, steps S314-S320 may be iterative until the adjusted pre-distorted position for each node is within tolerance at S316. It is noted that with each subsequent iteration, the distortion at each node may be less and less, and eventually the distortion may be less than the pre-set design tolerance 514. It is also noted that the scaling factor 522 for each node may be adjusted after each iteration based on the ratio between the designed tolerance for the node and the predicted distortion of the node.

In one or more embodiments, the system 500 may include one or more processing elements 524 and a memory/computer data store 526. The processor 524 may, for example, be a microprocessor, and may operate to control the overall functioning of the distortion and correction module 504. In one or more embodiments, the distortion and correction module 504 may include a communication controller for allowing the processor 524, and hence the distortion and correction module 504, to engage in communication over data networks with other devices (e.g., the additive manufacturing device 506 and user interface 528).

In one or more embodiments, the system 500 may include one or more memory and/or data storage devices 526 that store data that may be used by the module. The data stored in the data store 526 may be received from disparate hardware and software systems associated with AMM, or otherwise, some of which are not inter-operational with one another. The systems may comprise a back-end data environment employed by a business, industrial or personal context.

In one or more embodiments, the data store 526 may comprise any combination of one or more of a hard disk drive, RAM (random access memory), ROM (read only memory), flash memory, etc. The memory/data storage devices 526 may store software that programs the processor 524 and the distortion and correction module 504 to perform functionality as described herein.

As used herein, devices, including those associated with the system 500 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Figure 5:
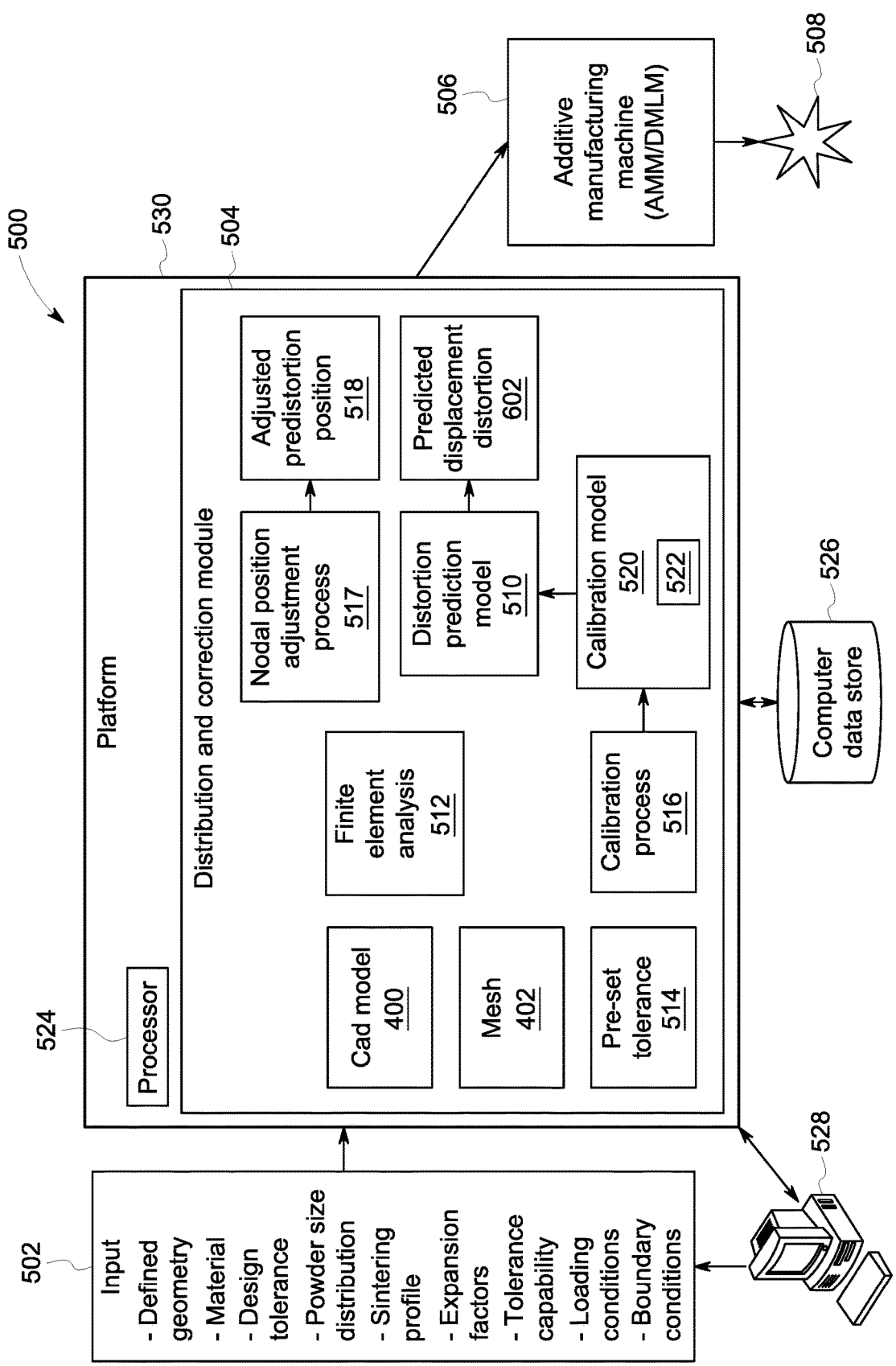
FIG. 5 illustrates a system according to some embodiments.

Turning to FIG. 5, a block diagram of system architecture 500 according to some embodiments is provided. Embodiments are not limited to architecture 500.

In one or more embodiments, the distortion and correction module 504 may reside on a platform 530. Platform 530 provides any suitable interfaces through which users may communicate with the distortion and correction module 504.

The computer data store 526 may, for example, be a database that may store data used by the distortion and correction module 504. For example, the database may store generated predicted positions and adjusted prediction positions.

The database may comprise any query-responsive data source or sources that are or become known, including but not limited to a structured-query language (SQL) relational database management system. Database 526 may comprise a relational database, a multi-dimensional database, an eXtendable Markup Language (XML) document, or any other data storage system storing structured and/or unstructured data. The data of database 526 may be distributed among several relational databases, dimensional databases, and/or other data sources. Embodiments are not limited to any number or types of data sources.

In some embodiments, the data of database 526 may comprise one or more of conventional tabular data, row-based data, column-based data, and object-based data. Moreover, the data may be indexed and/or selectively replicated in an index to allow fast searching and retrieval thereof. Database 526 may support multi-tenancy to separately support multiple unrelated clients by providing multiple logical database systems which are programmatically isolated from one another.

Database 526 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 7:
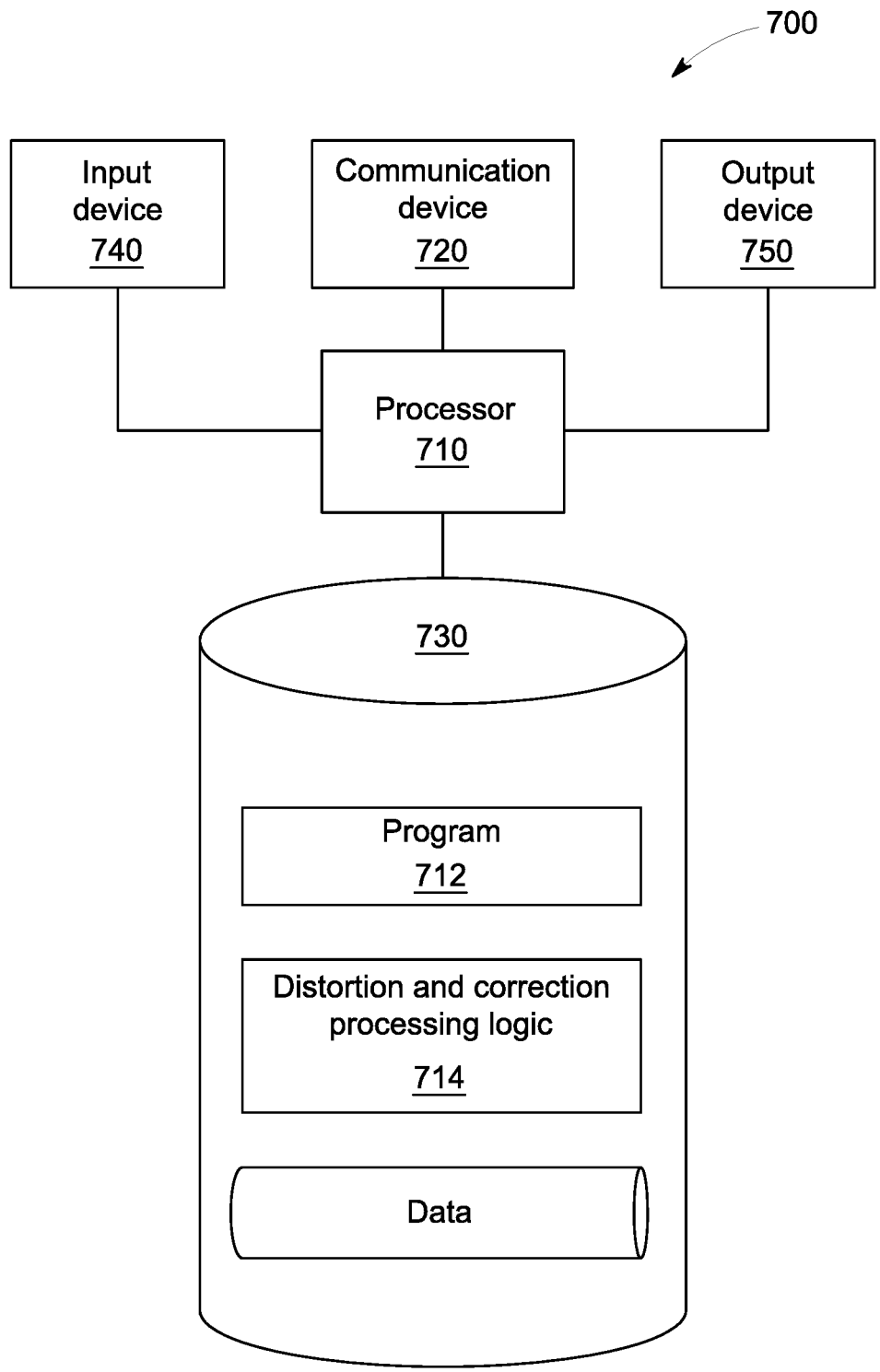
FIG. 7 illustrates a block diagram of a system according to some embodiments.

Note the embodiments described herein may be implemented using any number of different hardware configurations. For example, FIG. 7 illustrates a distortion and correction processing platform 700 that may be, for example, associated with the system 500 of FIG. 5. The distortion and correction processing platform 700 comprises a distortion and correction processor 710 ("processor"), such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more users. The distortion and correction processing platform 700 further includes an input device 740 (e.g., a mouse and/or keyboard to enter information about the part) and an output device 750 (e.g., to output and display the data and/or recommendations).

The processor 710 also communicates with a memory/storage device 730. The storage device 730 may comprise any appropriate information storage device, including combinations of magnetic storage devices (e.g., a hard disk drive), optical storage devices, mobile telephones, and/or semiconductor memory devices. The storage device 730 may store a program 712 and/or distortion and correction processing logic 714 for controlling the processor 710. The processor 710 performs instructions of the programs 712, 714, and thereby operates in accordance with any of the embodiments described herein. For example, the processor 710 may receive input and then may apply the distortion and correction module 504 via the instructions of the programs 712, 714 to generate a predicted distortion of a part and a correction/adjustment for the input geometry of the part.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a distortion and correction module. The method steps can then be carried out using the distinct software modules and/or sub-modules of the system, as described above, executing on one or more hardware processors 710 (FIG. 7). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
receiving, via a communication interface of a distortion and correction module comprising a processor, a defined geometry for a part, wherein the part is manufactured with an additive manufacturing machine;
setting one or more boundary conditions for the distortion and correction module, wherein the one or more boundary conditions include at least one of a gravity loading or a contact friction;
discretizing the defined geometry into a mesh including a plurality of nodes;
predicting a distortion of a position of each node of the plurality of nodes comprising executing a finite element model for the part based on one or more part parameters and the one or more boundary conditions, including the at least one of the gravity loading or the contact friction;

determining whether the predicted distortion of the position exceeds a pre-set tolerance;
determining an adjusted pre-distortion position for each node of the plurality of nodes when the predicted distortion of the position exceeds the pre-set tolerance;
predicting a distortion of the determined adjusted pre-distortion position for each node of the plurality of nodes, wherein the distortion and correction module calculates distortion of the part during sintering;
determining whether the distortion of the determined adjusted pre-distortion position exceeds the pre-set tolerance; and
printing the part when one of the predicted distortion position and the predicted adjusted pre-distortion position is below the pre-set tolerance.

2. The method of claim 1, wherein the additive manufacturing machine applies a binder jet printing process to manufacture the part.

3. The method of claim 1, wherein each node in the mesh represents a point on a surface of the part.

4. The method of claim 1, wherein the pre-set tolerance is one of a threshold value and a range of threshold values.

5. The method of claim 2, wherein the one or more part parameters include a material input and a geometry input, wherein the material input includes at least one of a powder size distribution, a sintering profile, one or more expansion factors, a weakest modulus; and a tolerance capability.

6. The method of claim 2, wherein the finite element model is executed based on:
the binder jet printing process as a steady state process; and
one or more material properties for a material undergoing a sintering process.

7. The method of claim 6, wherein the one or more material properties for the material undergoing the sintering process include at least one of an effective stiffness modulus, an effective Poisson's ratio and a density.

8. The method of claim 1, wherein determining the adjusted pre-distortion position for each node of the plurality of nodes further comprises:
reversing a direction of the predicted distortion position by an optimized scaling factor.

9. The method of claim 2, further comprising:
measuring the one or more parameters of the part;
determining whether each measured parameter is within a pre-set tolerance; and
executing a re-design process for the part.

10. The method of claim 1, wherein the at least one of the gravity loading or the contact friction represents a non-zero external force.

11. The method of claim 1, wherein the one or more boundary conditions include the gravity loading, and wherein the gravity loading represents gravity-induced sagging of the part.

12. The method of claim 1, wherein the one or more boundary conditions include non-zero displacement constraints relative to the pre-set tolerance.

13. A system comprising:
an additive manufacturing machine operative to fabricate a part;
a distortion and correction module; and
a memory in communication with the additive manufacturing machine and storing program instructions, the distortion and correction module operative with the program instructions and additive manufacturing machine to perform the functions as follows:
receive a defined geometry for the part;
set one or more boundary conditions for the distortion and correction module, wherein the one or more boundary conditions include at least one of a gravity loading or a contact friction;
discretize the defined geometry into a mesh including a plurality of nodes;
predict a distortion of a position of each node of the plurality of nodes by executing a finite element model for the part based on part parameters and the one or more boundary conditions;
determine whether the predicted distortion of the position exceeds a pre-set tolerance;
determine an adjusted pre-distortion position for each node of the plurality of nodes when the predicted distortion of the position exceeds the pre-set tolerance;
predict a distortion of the determined adjusted pre-distortion position for each node of the plurality of nodes;
determine whether the distortion of the determined adjusted pre-distortion position exceeds the pre-set tolerance, wherein the distortion and correction module calculates distortion of the part during the printing of the part; and
print the part when one of the predicted distortion position and the predicted adjusted pre-distortion position is below the pre-set tolerance.

14. The system of claim 13, wherein the additive manufacturing machine applies a binder jet printing process to manufacture the part.

15. The system of claim 13, wherein each node in the mesh represents a point on a surface of the part.

16. The system of claim 14, wherein the part parameters include a material input and a geometry input, wherein the material input includes at least one of a powder size distribution, a sintering profile, one or more expansion factors, a weakest modulus; and a tolerance capability.

17. A non-transitory computer-readable medium storing instructions that, when executed by a computer processor, cause the computer processor to perform a method comprising:
receiving, via a communication interface of a distortion and correction module comprising a processor, a defined geometry for a part, wherein the part is manufactured with an additive manufacturing machine that applies a binder jet printing process to manufacture the part;
setting one or more boundary conditions for the distortion and correction module, wherein the one or more boundary conditions include at least one of a gravity loading or a contact friction;
discretizing the defined geometry into a mesh including a plurality of nodes;
predicting a distortion of a position of each node of the plurality of nodes comprising executing a finite element model for the part based on part parameters and the one or more boundary conditions, including the at least one of the gravity loading or the contact friction;
determining whether the predicted distortion of the position exceeds a pre-set tolerance;
determining an adjusted pre-distortion position for each node of the plurality of nodes when the predicted distortion position exceeds the pre-set tolerance;
predicting a distortion of the determined adjusted pre-distortion position for each node of the plurality of nodes;

determining whether the distortion of the determined adjusted pre-distortion position exceeds the pre-set tolerance, wherein the distortion and correction module calculates distortion of the part during sintering; and printing the part when one of the predicted distortion position and the predicted adjusted pre-distortion position is below the pre-set tolerance.

18. The medium of claim 17, wherein each node in the mesh represents a point on a surface of the part.

19. The medium of claim 17 wherein the finite element model is executed based on:
   a binder jet printing process as a steady state process; and
   one or more material properties for a material undergoing a sintering process.

* * * * *